United States Patent [19]

Tokutomi

[11] 3,709,123
[45] Jan. 9, 1973

[54] FLASH ILLUMINATION OF PHOTOGRAPHED OBJECT

[75] Inventor: Seijiro Tokutomi, Fujisawa, Japan

[73] Assignee: Asahi Kogaku Kogyo Kabushiki Kaisha, Tokyo-to, Japan

[22] Filed: Oct. 26, 1971

[21] Appl. No.: 191,984

[30] Foreign Application Priority Data

Dec. 5, 1970 Japan ........................... 45/107754

[52] U.S. Cl. ............... 95/11.5 R, 95/10 CE, 315/159, 315/241 P
[51] Int. Cl. ............................................. G03b 9/70
[58] Field of Search ..355/68, 69; 240/1.3; 95/10 CE, 95/11.5 R; 250/214 P; 315/151, 159, 241 R, 241 P

[56] References Cited

UNITED STATES PATENTS

| 3,340,426 | 9/1967 | Elliott | 315/151 |
|---|---|---|---|
| 3,418,904 | 12/1968 | Wick et al. | 95/11.5 R X |
| 3,591,829 | 7/1971 | Murata et al. | 95/10 CE X |
| 3,648,104 | 3/1972 | Ackermann | 315/151 |

Primary Examiner—Samuel S. Matthews
Assistant Examiner—Fred L. Braun
Attorney—Steinberg & Blake

[57] ABSTRACT

A structure for providing a controlled flash illumination of an object which is to be photographed. A source of flash illumination first illuminates the object with a preparatory flash and then, during film-exposure, with a main flash. A preparatory control structure is electrically connected with the flash source for terminating the preparatory flash when the latter produces an amount of light which has a given relation with respect to the amount of light required to be subsequently produced during the main flash in order to achieve a proper film exposure. The amount of light produced during the preparatory flash illumination is electrically stored as a first electrical quantity, and the flash source is controlled during main flash illumination to produce a second electrical quantity corresponding to the amount of light produced during the main flash illumination, with the second quantity being compared to the first quantity. As a result of this comparison the main flash control structure automatically terminates the main flash when the amount of light produced thereby has the required relationship with respect to the amount of light produced during the preparatory flash illumination.

11 Claims, 3 Drawing Figures

INVENTOR
SEIJIRO TOKUTOMI

FLASH ILLUMINATION OF PHOTOGRAPHED OBJECT

BACKGROUND OF THE INVENTION

The present invention relates to photography.

In particular, the present invention relates to structures for illuminating artificially an object which is to be photographed.

One of the well known sources of artificial illumination is a structure for producing a flash illumination and capable of being directly connected to and carried by, as well as forming part of, a camera, such a structure including, for example, a xenon tube from which the light is derived for illuminating the object to be photographed.

With structures of the above type it is of course essential to control the extent to which the artificial illumination is provided by the flash source. One of the known arrangements for achieving such a control involves a preparatory flash which is made prior to actual exposure of the film, and from which it is possible to obtain, with the light reflected from the object during the preparatory flash, information used to control the main flash which takes place in synchronism with exposure of the film. Thus, it is known to measure the conditions under which the object is artificially illuminated during the preparatory flash operation, and then the exposure of the film is controlled on the basis of the results obtained during the preparatory flash illumination. Thus, according to this latter known procedure, the preparatory flash illumination and the main flash illumination are equal to each other, and the camera is adjusted prior to the main flash illumination in accordance with the lighting conditions detected during the preparatory flash illumination.

In practical constructions which are known it is essential to maintain a constant relation between the preparatory flash illumination and the main flash illumination in order to achieve an effective control of the exposure. In the event that the preparatory flash illumination takes place under unstable operating conditions there are unavoidable errors in achieving a properly controlled main flash illumination. Known structures of this type include capacitors which store information corresponding to the amounts of light provided during the flash illumination. The capacitance of capacitors will thus exert a considerable influence on the variation of the preparatory flash illumination. Since capacitors conventionally will have a certain instability in their operation, it is essential to utilize for structures of this type capacitors which are built with a high degree of accuracy and which have uniform capacitance values. In addition extremely fine adjustments are required in connection with the individual components used in a structure of the above type in order to achieve results which will have the required accuracy. However, experience has shown that such careful selection of capacitors and such fine adjustments represent an extreme inconvenience and are a source of an unusually high cost in the manufacture of the structure.

SUMMARY OF THE INVENTION

It is accordingly a primary object of the present invention to provide a construction which will avoid the above drawbacks.

In particular, it is an object of the present invention to provide a construction where a constant proportionality is maintained between the preparatory flash controls and the main flash controls in such a way that it becomes unnecessary to increase the cost of production by reason of the necessity of selecting with extreme care capacitors of very high quality and carrying out fine and inconvenient adjustments.

It is also an object of the present invention to maintain between the preparatory flash and main flash a proportionality which will enable the main flash illumination to be carried out in an effectively and accurately controlled manner within a wide range of variation.

Thus, it is an object of the invention to provide a main flash illumination which will have a given relationship with respect to the preparatory flash illumination, irrespective of conditions under which an exposure is made, so as to achieve and accurate exposure of the film without the drawbacks of previously known structures.

In particular, it is an object of the invention to provide a structure which will require during the preparatory flash illumination only an adjustment with respect to the film speed and which will on the basis of information received during the preparatory flash illumination be capable of achieving a highly effective and precisely controlled main flash illumination which will result in a proper exposure of the film.

According to the invention the amount of light produced during the preparatory flash illumination is controlled with the light reflected from the object to be photographed so that the time duration of the preparatory flash illumination is regulated in accordance with the distance of the object from the camera, the aperture setting, the filter index, and of course an adjustment for the speed of the film is also utilized in regulating the amount of light produced during the preparatory flash illumination. In accordance with this latter amount of light, a corresponding electrical quantity is stored, and then during the subsequent main flash illumination, the light reflected from the object is compared with the stored information resulting from the preparatory flash illumination with the main flash being automatically terminated when a given proportionality relation is achieved between the main flash and the preparatory flash. Under these conditions the flash illumination achieved during the main flash operation, within a range in which the light amount control is possible, represents a certain constant amount of light received by the film, irrespective of variations in the photographing conditions.

Thus, in accordance with the invention the structure includes a flash means for illuminating the object first with a preparatory flash illumination prior to exposure of the film and immediately thereafter with a main flash illumination during exposure of the film. A preparatory control means is electrically connected with the flash means for terminating the preparatory flash illumination when the latter produces an amount of light having a given relationship with respect to the amount of light required to be produced by the subsequent main flash illumination to achieve a proper exposure. A storing means is electrically connected with the flash means for storing the amount of light produced during the preparatory flash illumination as a first electrical quantity, and a main control means is electrically connected with the flash means for detecting the amount of light produced during the main flash illumination, for producing a second electrical quantity corresponding to the amount of light produced during the main flash illumination, for comparing the second quantity to the first quantity, and for terminating the main flash illumination when the second quantity has the above given relationship with respect to the first quantity.

BRIEF DESCRIPTION OF DRAWINGS

The invention is illustrated by way of example in the accompanying drawings which form part of this application and in which.

DESCRIPTION OF PREFERRED EMBODIMENTS

In accordance with the present invention, recognition is made of certain factors as follows:

Let the light amount to be received by film for proper exposure according to its sensitivity be A (Lx. sec.). As a practical matter, the amount of light required for the preparatory flash illumination need not be as great as that required for proper exposure of the film, so that the amount of light utilized during preparatory flash illumination may be $1/\alpha$ of the light amount required for proper exposure. Accordingly, the light amount which would be received by the film due to preparatory flash illumination is $A/\alpha$ (Lx. sec.). Let this preparatory flash amount, which is the light amount to be received plus the light amount decrement due to the photographic conditions be $I_S$ (Lx. sec.). Then, if the main flash amount $I_M$ satisfies the relation $I_M = I_S \cdot \alpha$, this main flash amount enables the operator to obtain a proper exposure of the film with the light amount A (Lx. sec.).

Figure 1:
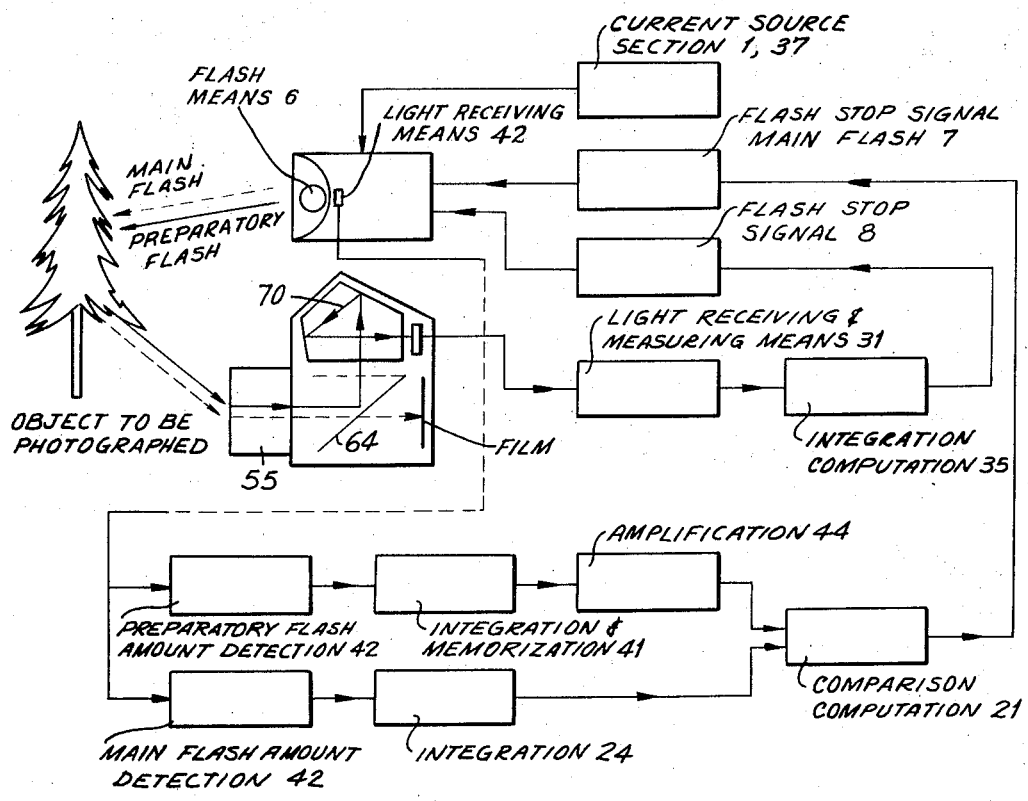
FIG. 1 is a schematic illustration of the structure of the invention and the manner in which it operates.

An arrangement of a structure according to the present invention is schematically represented in FIG. 1. After completion of preparation for the preparatory flash operation and the immediately following main flash operation is made by the current source section 1,37 the flash means 6 first operates to carry out the preparatory flash operation during which light is directed to the object to be photographed subsequently in synchronism with camera operation. The light rays of the preparatory flash illumination are reflected by the object and are received by and pass through the objective 55 of the schematically illustrated single lens reflex camera. This reflected light is received by the tiltable mirror 64 and is reflected from the tiltable mirror 64 to the viewfinder light path 70. A light receiving and measuring means 31 is situated in the path of light traveling beyond the viewfinder light path 70, in order to receive the light reflected during the preparatory flash illumination. The light receiving and measuring means 31 provides an electrical signal or quantity in response to the intensity of the reflected light, and this signal or quantity is sent to an integration-computation means 35 which integrates the electric information corresponding to the amount of reflected preparatory flash illumination and computes an electrical quantity which corresponds to the amount of light reflected during preparatory flash illumination. When this latter computed quantity reaches a predetermined value, corresponding to that which is required for proper exposure in accordance with the speed of the film which is in the camera, a flash-terminating means 8 provides a flash stop signal which is delivered to the flash means 6 in order to terminate the preparatory flash. Thus, the flash means 6 provides a preparatory flash illumination which is controlled by the preparatory control means which includes the components 31, 35, and 8, so that the preparatory flash illumination is automatically terminated when the amount of light reflected from the object corresponds to that which is required for proper exposure of the film.

Simultaneously with this preparatory flash operation, another light-receiving means 42 detects the light produced during the preparatory flash illumination, and this amount of light is computed and stored at the integration and memory means 41. This memory means 41 will store the information corresponding to the amount of light produced during preparatory flash illumination as a first electrical quantity which subsequently is amplified by the amplifying means 44.

Of course, these preparatory flash illumination operations take place just prior to actual exposure of the film. In synchronism with opening of the shutter and exposure of the film, the main flash illumination operations are carried out immediately subsequent to the preparatory flash illumination operations. The flash means 6 forms the source of artificial light for the main flash illumination as well as for the preparatory flash illumination. Thus, this flash means 6 is again actuated in synchronism with opening of the shutter in order to provide the main flash illumination. During the main flash illumination the mirror 64 is of course swung up to the dotted line position shown in FIG. 1, beyond the path of light traveling through the objective 55, so that now the light reflected from the object during the main flash illumination, shown by the dotted lines in FIG. 1, is received by the film schematically shown in the camera of FIG. 1. Thus, during the main flash illumination, since the mirror 64 has been swung up, the light rays do not reach the viewfinder light path 70. Instead the light travels to the film in order to expose the latter.

However, during the main flash illumination, the light-receiving means 42 again detects the amount of light produced during the main flash illumination, and at this time the means 42 is switched over, in a manner described below, so as to deliver a signal to the integrating means 24 where the amount of light produced by the flash means 6 during the main flash illumination is converted into a corresponding electrical quantity. Thus, the same detecting means 42 and flash means 6 are used both during preparatory flash illumination operations and main flash illumination operations.

While the main flash illumination is going forward, the quantity memorized by the means 41 and amplified by the means 44 is compared with the electrical quantity at the integrating means 24 by a comparison and computation means 21 so that through this latter means 21 it is possible to determine when the main flash illumination has a given relationship with respect to the preparatory flash illumination. When the comparing and computing means 21 detects that the amount of light produced during main flash illumination has reached a given value with respect to the amount of light produced during preparatory flash illumination, the means 21 actuates a means 7 which provides a flash stop signal in order to terminate operation of the flash means 6.

Figure 2:
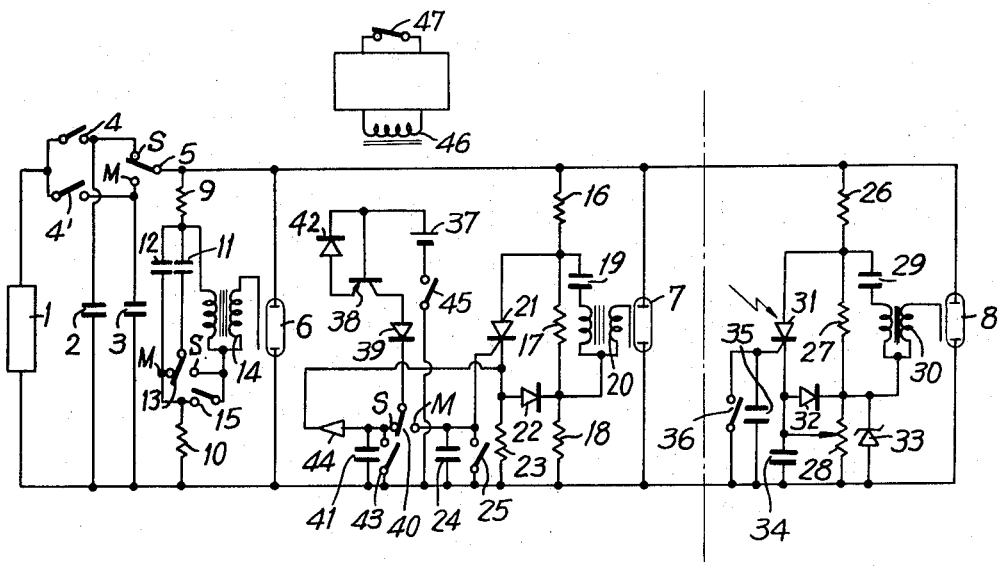
FIG. 2 is a wiring diagram of the structure of the invention.

This structure of the invention which is illustrated diagrammatically in block form in FIG. 1 is shown also in the wiring diagram of FIG. 2.

Referring to FIG. 2 it will be seen that the circuitry includes a layer-built dry cell or a DC-DC converter 1 which forms a DC high voltage source. The current source 1 is electrically connected with a preparatory flash capacitor 2 as well as with a main flash capacitor 3, and these capacitors are in parallel, the connection to the capacitors 2 and 3 being provided by switches 4 and 4' which are operatively linked to each other so that they will operate in unison. The circuitry also includes a change-over switch 5 which is arranged so as to be electrically connected either with one pole of the capacitor 2 or with one pole of the capacitor 3 when the switches 4 and 4' are opened. Thus, the switch 5 is shown in FIG. 2 engaging a contact S to provide a connection to the capacitor 2, while the switch 5 can be changed over to engage the contact M in order to provide a connection to the capacitor 3. The other poles of the capacitors 2 and 3 are connected to each other to form a junction.

Between this latter junction and the change-over switch 5 there are connected, in parallel with each other, a flash discharge tube 6 which forms the flash means referred to above and a trigger circuit for controlling the flash means 6. The circuitry also includes a by-pass discharge tube 7 which forms one of the flash stop means referred to above in connection with FIG. 1, this discharge tube 7 when energized serving in a well known manner to extinguish the flash means 6, the circuitry including also a trigger circuit for controlling the discharge tube 7. Also, the circuitry includes a by-pass discharge tube 8, which forms the flash stop means for the preparatory flash illumination, and this discharge tube 8 is also controlled by a trigger circuit.

The trigger circuit for the flash means 6 includes the high-value resistors 9 and 10. Between these resistors there are, in parallel with each other, a preparatory flash trigger capacitor 11 and a main flash trigger capacitor 12. These latter capacitors 11 and 12 are connected in parallel with each other when the change-over switch 13 engages the contact M, as illustrated in FIG. 2. When the change-over switch 13 is changed over to engage the S contact illustrated in FIG. 2, the preparatory flash trigger capacitor 11 and the primary winding of the trigger pulse transformer 14 are connected in parallel with each other.

The circuitry of FIG. 2 also illustrates a synchronous switch 15, corresponding to the known X contact on cameras, which operates in synchronism with operation of the camera shutter in a known way so that when the switch 15 closes in synchronism with opening of the shutter the main flash trigger capacitor 12 is electrically connected to the primary winding of the trigger pulse transformer 14. The output end of the secondary winding of the trigger pulse transformer 14 is positioned next to the side wall of the flash discharge tube 6 so as to bring about energizing thereof through one or the other of the capacitors 2 and 3 in a well known manner.

The trigger circuit of the by-pass discharge tube 7 includes the high-value resistors 16, 17 and 18 which are connected in series with the resistor 17 between the resistors 16 and 18. In parallel with the resistor 17 is a trigger capacitor 19 and a primary winding of a trigger pulse transformer 20 of the trigger circuit for the discharge tube 7. The capacitor 19 and the primary winding of transformer 20 are connected in series. Also connected in parallel with the intermediate resistor 17 is an SCR (silicon controlled rectifier element) 21 and a diode 22 which are connected in the forward direction, this SCR 21 forming the comparison and computation means 21 illustrated in the block diagram of FIG. 1.

The circuitry also includes a short-circuit switch 25 which is connected across a capacitor 24, in parallel with the latter, as illustrated at the lower central part of FIG. 2, this switch 25 being operated in synchronism with operation of the camera while the capacitor 24 forms the integration means which provides an electrical quantity corresponding to the amount of light produced during the main flash illumination, as described above in connection with FIG. 1 where the capacitor 24 is illustrated as the lower integration block.

The trigger circuit for the by-pass discharge tube 8, which when energized terminates the preparatory flash illumination, includes the high-value resistors 26, 27, and 28 which are connected in series with the resistor 27 situated between the resistors 26 and 28. In parallel with the intermediate resistor 27 is a trigger capacitor 29 which is in series with the primary winding of a trigger pulse transformer 30. Also connected in parallel with the resistor 27 is a photosensitive silicon controlled rectifier element 31 which acts as the light-receiving and measuring means which receives the reflected light produced during the preparatory flash illumination after this light moves beyond the viewfinder light path 70, as described above in connection with FIG. 1. Thus the photo SCR 31 serves as a light-responsive element and it is connected to a diode 32, with the elements 31 and 32 both being connected together in a forward direction as illustrated in FIG. 2. This circuitry further includes a voltage regulator diode 33 connected in parallel with the high-value resistor 28 which is a variable resistor capable of being set to a given setting in accordance with the film speed. This circuitry also includes the illustrated capacitor 34 which forms a by-pass capacitor. The control electrode of the SCR 31 is connected to one pole of a timing capacitor 35 which forms the integration computation means shown in FIG. 1 receiving the signal from the means 31. A short-circuit switch 36 is connected in parallel with the capacitor 35. This switch 36 also is operated during the camera operation in a manner described in greater detail below. The output end portion of the secondary winding of the trigger pulse transformer 30 is located next to the wall of the by-pass discharge tube 8 so as to bring about in a well known manner energizing of the latter to extinguish the operation of the flash means 6.

The current source section includes, in addition to the source 1 referred to above, a low-voltage direct current source 37 which forms the current source for the flash-amount measuring section. The circuit which includes the current source 37 includes the illustrated transistor 38, a diode 39, and a change-over switch 40 which is shown engaging an S contact to provide connection with a capacitor 41 which forms the integration and memory means for acting as a storing means to store an electrical quantity corresponding to the illumination produced during preparatory flash illumination. When the switch 40 is changed over to engage the contact M, the capacitor 24 is connected into the circuit, so that it is this switch 40 which switches the detecting means 42 between the components 41 and 24, as described above in connection with FIG. 1. The detecting means 42 is in the form of a photo diode electrically connected between the base and collector of the transistor 38. This photo diode 42 is positioned directly at the flash means 6, as shown schematically in FIG. 1, immediately beyond the flash tube so as to detect the light produced by the flash means during operation thereof. A short-circuit switch 43, which is operated during camera operation as described in greater detail below, is connected in parallel with the timing capacitor 41.

A high input impedance amplifier 44 forms the amplifying means shown also in the block diagram of FIG. 1 and has its input side connected to one pole of the capacitor 41 while the output side is connected to the negative or cathode electrode of the SCR 21. A switch 45 is connected to the current source 37 to actuate the latter.

The several switches 4, 4', 25, 36, 43, 45 and 13 are in the form of relay switches actuated by energizing of one or more solenoids 46, the solenoid 46 being energized or deenergized through the switch 47, as shown at the upper part of FIG. 2. This switch 47 is actuated by a transmission means of the camera in a manner described in greater detail below. The switches 4, 4', 25, 36, 43 and 45 are operated simultaneously while the switch 13 is operated at a slightly later moment, and these switch operations are preformed during a time which terminates with tripping of the shutter to start the exposure as the result of depression of a shutter button of the camera which in the illustrated example is a single lens reflex camera. Thus, after the diaphragm of the camera has been stopped down to provide the preselected aperture, and before the mirror 64 is withdrawn from the path of light traveling through the objective 55, the above operation of these switches has been performed. Other switches 5 and 40 are actuated by the mirror itself as it swings up to the dotted line position of FIG. 1 beyond the path of light traveling through the objective.

Figure 3:
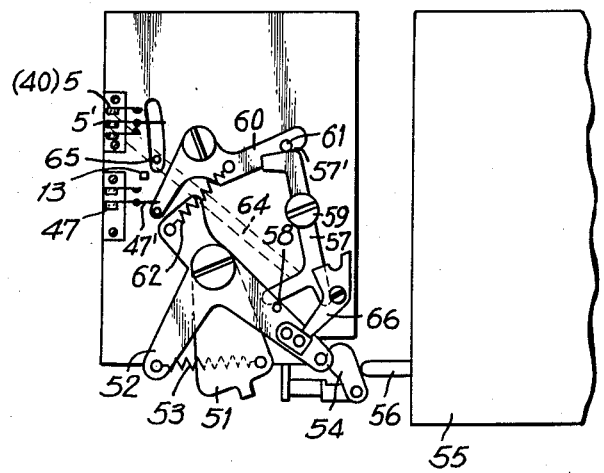
FIG. 3 is a schematic illustration of a motion transmitting means and the manner in which it stops down the camera diaphragm and actuates switches.

FIG. 3 illustrates the motion-transmitting means of the camera for operating the switch 47 which brings about control of the solenoid 46. Referring to FIG. 3, there is illustrated an energizing lever 51 which is supported for swinging movement about the axis of a suitable stationary pivot pin and which is swung in a counterclockwise direction to the position illustrated in FIG. 3 simultaneously with advancing of the film by the film-advancing structure of the camera. Thus, during winding of the film the lever 51 will be turned so as to tension the spring 53 which is connected between the lever 51 and a driving lever 52 of the motion-transmitting means. A stop-down driving member 54 is positioned at a free end of the driving lever 52 and is engaged by the lever 52 when the lever 52 is in a position ready for operation as illustrated in FIG. 3. This lever 54 actuates a stop-down driving pin 56 which extends into the objective 55 and serves in a known manner to stop the diaphragm down to the preselected aperture. The pin 56 engages an exterior surface of the lever 54.

A control lever 57 is supported intermediate its ends by a pivot 59 and has an elongated free end portion 57' extending along an arc of a circle whose center is in the turning axis determined by the pivot 59. This portion 57' engages a pin 61 carried by a lever 60 supported for swinging movement by a pivot situated at the elevation of a slot through which extends a pin 65 fixed to the frame of the swingable mirror 64 which swings about its upper left edge, as illustrated in FIG. 3. A spring 62 is connected between the levers 60 and 52.

The switch 47 includes a flexible springy arm 47' positioned in the path of a pin carried by the lever 60 at its lower left end, as viewed in FIG. 3. The upper edge of the lever 60 extending between the pivot thereof and the slot through which the pin 65 extends is adapted to engage the pin 65 in order to raise the latter and thus swing the mirror 64 upwardly out of the path of light traveling through the objective 55. As the pin 65 approaches the end of its swinging movement upwardly along the arcuate slot illustrated in FIG. 3, it engages the switches 5 and 40. Only the switch 5 is illustrated in FIG. 3 having the springy arm 5' adapted to be displaced between the contacts illustrated in FIG. 3, corresponding to the contacts S and M described above in connection with FIG. 2, and it is to be understood that the switch 40 is arranged in the identical manner to be actuated also by the pin 65, these switches 5 and 40 being situated beside each other or with their swingable blades located one directly over the other in a well known manner.

FIG. 3 also illustrates a swingable stop lever 66 which engages a projection carried by the lever 52 so as to prevent the latter from being acted upon by the spring 53 until the lever 66 is swung in a counterclockwise direction, as viewed in FIG. 3, by actuation of the shutter button, so as to release the lever 52 to be acted upon by the spring 53.

All of the switches referred to above, with the exception of switch 15, form a switch means actuated by the motion-transmitting means illustrated in FIG. 3 and described above. The switch 15 is actuated in synchronism with opening of the shutter in a well known manner, as referred to above, this switch 15 being the X contact switch as known in conventional cameras. When the camera is operated, there are three stages in the operation, namely a first stage when preparation is made for the flash exposure, a second stage during which the shutter button is actuated with the diaphragm being stopped down and the preparatory flash taking place, and finally a third stage when the shutter is actually tripped at the end of the movement of the shutter button with the mirror swinging up and the main flash taking place. The condition of the several switches during the various stages of the operation is indicated in the table below with the several switches in the first column of the table being followed by an element in parentheses which controls the switch, all of the switches except the switch 13, which are actuated by the solenoid 46 being actuated in unison, as shown by the table below where these switches are related to the single line I, while the switch 13 has the designation II to show that it is actuated by the solenoid shortly after the remaining switches which are actuated by the solenoid 46. During the stage when preparation for the flash operation takes place, the several switches have the open or closed positions indicated in the table with the switch 13 engaging the M contact, while the switches 5 and 40 engage the S contact. During the subsequent stage when the preparatory flash illumination takes place, all of the switches change their position with the exception of the switches 5, 15, and 40, as indicated in the table. Then during the final stage when the main flash illumination takes place, all of the switches remain in the indicated positions except for the switches 5, 15, and 40 which take the positions indicated in the last column of the table.

TABLE OF SWITCH OPERATION

| Switches | Preparation for flash | Shutter button ↓ Stop down ↓ Prep. flash | After prep. flash ↓ Mirror up ↓ Main flash |
|---|---|---|---|
| I ⎰ 4 (46) | Closed | Open | |
| 4' (46) | do | do | |
| 5 (mirror) | S | | M. |
| II — 13 (46) | M | S | |
| 15 (X) | Open | | Closed. |
| 25 (46) | Closed | Open | |
| 36 (46) | do | do | |
| 40 (mirror) | S | | M. |
| 43 (46) | Closed | Open | |
| 45 (46) | Open | Closed | |
| 47 (60) | do | do | |

Thus, in preparation for flash operation, the switches 4 and 4' are closed, the change-over switches 5 and 40 engage the S contact, the change-over switch 13 engages the M contact, the synchronous switch 15 and the current source switch 45 are opened, and the short-circuit switches 43, 25 and 36 are closed. With the structure in this condition, the high voltage source 1 charges the preparatory flash capacitor 2, the main flash capacitor 3, and the several trigger capacitors 11, 12, 19 and 29, up to a predetermined level.

During the first part of the depression of the shutter button of the camera, in order to make an exposure, the stop lever 66 of FIG. 3 is swung in a counterclockwise direction, as viewed in FIG. 3, releasing the driving lever 52 to the force of the spring 53. Therefore, the spring 53 swings the driving lever 52 in a counterclockwise direction, as viewed in FIG. 3. The result is that the illustrated motion-transmitting means turns the lever 54 in a clockwise direction to push the pin 56 so as to stop the diaphragm automatically down to the preselected aperture. Simultaneously the driving lever 52 acts through the pin 58 on the lever 57 to swing the latter in a clockwise direction about the pivot 59, and the arcuate edge 57' moves along the pin 61 while the lever 60 remains in the position illustrated in FIG. 3. It is only when the driving lever 52 reaches the end of its range of swinging movement that the lever 57 swings at its edge 57' beyond the pin 61 to release the latter to the force of the spring 62. Then the spring 62 acts on the lever 60 to swing the latter in a clockwise direction, and the lever 60 will engage the pin 65 and swing the mirror 64 upwardly.

Thus, the above-described motion-transmitting means will provide a delay between the release of the lever 60 and the resulting swinging upwardly of the mirror 64 and the initial release of the lever 52. This delay is somewhat longer than the corresponding delay which is encountered in conventional single lens reflex cameras. This difference in time is the duration during which with the structure of the invention the edge 57' rides along the pin 61 while stopping down of the diaphragm is completed. Therefore with the structure of the invention the diaphragm has been stopped down to the preselected aperture before the preparatory flash takes place.

The preparatory flash operation takes place immediately upon completion of the stop-down operation. When the diaphragm has been stopped down to the preselected aperture, the edge 57' of lever 57 has travelled beyond the pin 61, so that now the lever 60 swings in a clockwise direction. During the initial part of this swinging of the lever 60 the contact 47' is displaced so as to close the switch 47 in order to energize the solenoid 46. As a result, as indicated in the second column of the above table, the switches 4, 4', 25, 36, and 43 are opened, while the switch 45 is simultaneously closed. Shortly thereafter the switch 13 is displaced from the M contact to the S contact. This switch 13 is thus schematically shown in FIG. 3 situated slightly behind the switch 47 in the path of movement of the lower end of the lever 60. Thus, the lag between operation of the switch 13 and the remaining switches which are operated by the solenoid 46 can be brought about by use of a second solenoid or the time lag can be obtained with a single solenoid but with the switches arranged in such a way that the switch 13 will be displaced subsequent to the remaining switches which are actuated by the solenoid 46. For example the armature of the solenoid 46 may be arranged to actuate the switch 13 subsequent to actuation of the other switches by the solenoid 46.

This displacement of the switch 13 into engagement with the contact S places the trigger capacitor 11 in electrical connection with the pulse transformer 14. Due to the discharge of the capacitor 11 a high voltage pulse is produced at the secondary of the transformer 14 with the result that the charge of the preparatory flash capacitor 2 is discharged and flash means 6 is energized so as to produce the preparatory flash illumination.

During this time the diaphragm of the camera has already been stopped down to the preselected aperture as indicated above. Therefore, the light reflected from the object due to the preparatory flash illumination is limited by the aperture which will be subsequently used during exposure of the film, and thus a bundle of light rays corresponding to that used during actual exposure will pass through the objective 55 to the mirror 64 to be reflected thereby along the viewfinder light path 70 and from the latter to the SCR 31. At the SCR 31 a photo current whose intensity corresponds to the intensity of the reflected light passes through the anode and gate of the component 31. This current is integrated by the timing capacitor 35. When the gate voltage reaches the trigger level with respect to he cathode voltage which has been preliminarily adjusted by the resistor 28 and the capacitor 34, in accordance with the film speed, the element 31 is turned on, or in other words becomes conductive, so that the charge at the capacitor 29 discharges through the trigger pulse transformer 30. The result is that the by-pass tube 8 becomes energized due to the secondary high-voltage side of the transformer 30. The instant when the by-pass tube 8 becomes conductive brings about an immediate termination of the flash discharge from the flash means 6, so that the preparatory flash illumination is automatically terminated in this way. Thus, the preparatory control means shown at the right of FIG. 2 will control the preparatory flash illumination so as to terminate the latter when light required for proper exposure of the film during the subsequent main flash illumination has been provided during the preparatory flash illumination.

Simultaneously with the preparatory flash illumination operations described above, light produced by the flash means 6 is detected by the photo diode 42, and a current, the intensity of which corresponds to the intensity of the bundle of light rays, flows to the capacitor 41, which forms the storing means for storing an electrical quantity corresponding to the amount of light provided during the preparatory flash illumination. Thus, the capacitor 41 is charged with a charge which corresponds to the preparatory flash illumination.

Immediately after completion of the preparatory flash illumination operations, the mirror 64 is swung up to the dotted line position shown in FIG. 1, and the pin 65 operates the switches 5 and 40, so that these switches now move from the S contact to the M contact. The result is that the switch 5 now disconnects the capacitor 2 from the circuit and connects the capacitor 3 into the circuit. At the same time the light-detecting means 42 is disconnected from the storing means 41 and is instead connected to the capacitor 24 which forms the integrating means to be used during the main flash illumination. Also, as is well known in single lens reflex cameras, when the mirror 64 reaches the dotted line position shown in FIG. 1, the shutter is tripped open and at the same instant through the X contact for synchronous flash illumination the switch 15 is closed. As a result the trigger capacitor 12 is connected to the trigger pulse transformer 14 so that due to the charge on the main flash capacitor 3 the flash tube 6 is energized to provide the main flash illumination. The light provided at this time is directly received by the photo diode 42 in the same manner as during the preparatory flash operation, and a controlled current in correspondence with the intensity of the bundle of flash light rays flows to the capacitor 24. The voltage across the capacitor 24 is impressed between the gate and the cathode of the SCR 21. The voltage across the capacitor 41 forms an electrical quantity corresponding to the amount of light produced during the preparatory flash illumination and is applied to the input impedance amplifier 44. The output of the amplifier 44 is applied to the cathode side of SCR 21 as a bias. Accordingly, the rise of voltage across the capacitor 24 during the main flash illumination is compared with the preparatory flash illumination as amplified by the amplification factor produced by the amplifying means 44. When the light produced during the main flash illumination reaches a value which corresponds to this amplified preparatory flash illumination, which is to say when the value of the voltage across the capacitor 24 is greater than the value of the cathode voltage of the SCR 21, then the latter is turned on to bring about discharge of the capacitor 19 through the primary winding of the trigger pulse transformer 20. As a result of the high voltage produced at the secondary winding of the transformer 20, the by-pass discharge tube 7 is discharged so that the charge on the capacitor 3 for the flash means 6 is by-passed instantaneously and the main flash is terminated.

Thus, as is apparent from the above description, in accordance with the present invention the condition of the object to be photographed is detected during the preparatory flash illumination, and on the basis of the information received from the preparatory flash illumination and stored as a corresponding electrical quantity, the amount of light produced during the main flash illumination is controlled so as to provide a proper exposure for the film. During this control operation of the main flash, the amount of light produced during the main flash is compared with the amount of light which was previously produced during the preparatory flash illumination. Thus, with the present invention there is no undesirable influence on the control of the flash illumination due to source voltage fluctuation of the flash means or fluctuation of the capacitance of any of the capacitors which are charged during the flash operation, so that with this structure of the present invention there is always an accurate control of the light produced for exposing the film.

While with the above-described structure of the invention a photo diode 42 and a photo SCR element 31 are used as the light-responding elements which are photosensitive and respond to the light, it is also possible to use instead well-known phototransistors, photoconductors, or photocells as the photosensitive means with the circuits suitably altered in order to accommodate components of this latter type.

Also, while with the structure described above the integrating charge of a capacitor is used for the means to transform the light produced during a flash operation into a corresponding electrical quantity, other well-known information transforming means can be utilized. It is also possible to control the amount of light by detecting current variation or voltage variation of the energizing charge due to the flash discharge. The flash stop control may also be performed by means of semiconductor by-pass elements. Also, the flash stop control may be carried out by an arrangement where semiconductor switching elements disconnect the flash tube from the capacitor which has the charge required for flash operation.

What is claimed is:

1. In a structure for providing a controlled flash illumination of an object which is to be photographed, flash means for illuminating the object first with a preparatory flash illumination prior to exposure of film and immediately thereafter with a main flash illumination during exposure of film, preparatory control means electrically connected with said flash means for terminating the preparatory flash illumination when the latter produces an amount of light having a given relationship with respect to the amount of light required to be produced by the subsequent main flash illumination to achieve a proper exposure, storing means electrically connected with said flash means for storing the amount of light produced during the preparatory flash illumination as a first electrical quantity, and main control means electrically connected with said flash means for detecting the amount of light produced during main flash illumination, for producing a second electrical quantity corresponding to the amount of light produced during the main flash illumination, for comparing the second quantity to the first quantity, and for terminating the main flash illumination when the second quantity has said given relationship with respect to the first quantity.

2. The combination of claim 1 and wherein a single source of illumination forms part of said flash means and provides both the preparatory flash illumination and the main flash illumination.

3. The combination of claim 1 and wherein a single light-detecting means is operatively connected with said storing means for coacting with the latter to provide said first quantity and with said main control means for providing the second quantity which is compared with the first quantity by said main control means.

4. The combination of claim 1 and wherein an amplifying means is electrically connected with said storing means for amplifying the first quantity according to a given amplification factor which determines the relationship between the preparatory flash illumination and the main flash illumination, said main control means comparing the second quantity with the first quantity as amplified by said amplifying means.

5. The combination of claim 1 and wherein said storing means includes a first capacitor which stores said first quantity as a charge on said first capacitor, said main control means including a second capacitor which receives a charge according to the main flash illumination, and said main control means including an SCR electrically connected with both capacitors for comparing the charges thereof.

6. The combination of claim 5 and wherein said main control means further includes a by-pass discharge tube electrically connected to said flash means for terminating the main flash when said by-pass discharge tube is energized and a trigger circuit for energizing said by-pass discharge tube, said SCR being electrically connected with said trigger circuit for actuating the latter to energize said by-pass discharge tube when said second quantity has said given relationship with respect to said first quantity.

7. The combination of claim 6 and wherein a second by-pass discharge tube is electrically connected with said flash means for terminating the preparatory flash illumination when said second by-pass discharge tube is energized, said second discharge tube forming part of said preparatory control means and the latter including a trigger circuit for triggering said second by-pass discharge tube when the quantity of light produced by said preparatory flash illumination has a given relationship with respect to the required main flash illumination.

8. The combination of claim 7 and wherein an adjusting means is electrically connected with said trigger circuit of said preparatory control means for adjusting the latter in accordance with the speed of the film which is to be exposed.

9. The combination of claim 1 and wherein an adjusting means is electrically connected with said preparatory control means for adjusting the latter according to the speed of the film which is to be exposed.

10. The combination of claim 1 and wherein a switch means is electrically connected with said flash means and both of said control means for actuating said flash means and both of said control means in a given sequence, and motion-transmitting means coacting with said switch means for actuating the latter first to operate said flash means to provide said preparatory flash illumination while simultaneously operating said preparatory control means and for then operating said flash means to produce said main flash illumination while simultaneously operating said main control means, said switch means also including a switch for actuating said flash means to produce the main flash illumination in synchronism with operation of a shutter of the camera.

11. The combination of claim 10 and wherein a diaphragm stop-down means is operatively connected with said motion-transmitting means to be actuated thereby for stopping down a diaphragm of the camera prior to operation of said switch means by said motion-transmitting means.

* * * * *